United States Patent
Leist et al.

(10) Patent No.: US 6,624,423 B2
(45) Date of Patent: Sep. 23, 2003

(54) SEMICONDUCTOR DETECTOR FOR THERMAL NEUTRONS BASED ON PYROLYTIC BORON NITRIDE

(75) Inventors: Jon Russell Leist, North Olmsted, OH (US); Arthur William Moore, Strongsville, OH (US); Ajit Yeshwant Sane, Medina, OH (US)

(73) Assignee: General Electric Company, Pittsfield, MA (US)

( * ) Notice: Subject to any disclaimer, the term of this patent is extended or adjusted under 35 U.S.C. 154(b) by 12 days.

(21) Appl. No.: 10/046,853

(22) Filed: Jan. 14, 2002

(65) Prior Publication Data

US 2003/0132390 A1 Jul. 17, 2003

(51) Int. Cl.[7] .............................. G01T 3/08; G21G 4/02
(52) U.S. Cl. ............................ 250/370.05; 250/390.01; 117/952
(58) Field of Search ....................... 250/370.05, 390.01; 117/952

(56) References Cited

U.S. PATENT DOCUMENTS

| | | | | |
|---|---|---|---|---|
| 4,393,307 A | * | 7/1983 | Nozaki et al. ............... 250/390 |
| 4,655,849 A | * | 4/1987 | Schachameyer et al. ...... 148/1.5 |
| 4,690,841 A | | 9/1987 | Tanji et al. | |
| 4,806,502 A | * | 2/1989 | Jorke et al. .................. 437/106 |
| 5,002,720 A | * | 3/1991 | Berggren .................... 376/154 |
| 5,225,032 A | * | 7/1993 | Golecki ....................... 156/612 |
| 5,334,840 A | * | 8/1994 | Newacheck et al. ...... 250/483.1 |
| 5,343,022 A | | 8/1994 | Gilbert, Sr. et al. | |
| 5,399,863 A | * | 3/1995 | Carron et al. ............. 250/370.05 |
| 5,973,328 A | * | 10/1999 | Hiller et al. .............. 250/390.01 |
| 6,011,266 A | * | 1/2000 | Bell ......................... 250/390.01 |
| 6,440,786 B1 | * | 8/2002 | Dowben ....................... 438/183 |
| 2002/0067789 A1 | * | 6/2002 | Wallace et al. .............. 376/154 |
| 2002/0106047 A1 | * | 8/2002 | Vourvopoulos .............. 376/159 |

FOREIGN PATENT DOCUMENTS

| | | | | |
|---|---|---|---|---|
| EP | 0 450 528 | | 10/1991 | |
| EP | 0 851 042 | | 7/1998 | |
| JP | 01253683 A | * | 10/1989 | ............ 250/370.05 |
| JP | 02082188 A | * | 3/1990 | ............ 250/390.01 |
| JP | 10001304 | | 1/1998 | |

OTHER PUBLICATIONS

"The Many Faces Of Boron Nitride", reprinted from Materials Engineering, Nov. 1990, pp. 5–8.

* cited by examiner

Primary Examiner—Diego Gutierrez
Assistant Examiner—Gail Verbitsky

(57) ABSTRACT

A pBN neutron detector and method of forming a pBN neutron detector with the neutron detector formed by depositing multiple layers of pBN having a crystalline lattice structure with its crystallographic 'c plane' predominantly parallel to the deposited layers. The neutron detector forms a geometry having two opposite sides aligned parallel to the 'ab planes' of the structure and has a thickness of between one micron and one mm between the opposite sides. Metallized contacts are applied to the opposite sides and the detector is oriented relative to a source of neutrons such that the neutrons pass through the volume of the detector and cause electrons to flow in response to alpha particles generated from the interaction of neutrons with the Boron-10 isotope present in pBN.

13 Claims, 3 Drawing Sheets

PYROLYTIC BORON NITRIDE'S
HEXAGANOL STRUCTURE

IMAGE OF TRENCH APPLIED AND
CURES IMAGE INTO RESIST

DEVELOPING AGENT REMOVES
CURED RESIST

ETCHANT DUPLICATES TRENCH INTO pBN
(DEPTH OF TRENCH DEPENDENT UPON
TIME OF ETCHING)

CONTACT MATERIAL EVAPORATED INTO
TRENCH & ONTO RESIST

METAL ON RESIST & RESIST REMOVED
CHEMICALLY

CONTACTS IN TRENCHES (+) (−) (+) (−)

.008" MINIMUM

SENSING AREA BETWEEN TRENCHES

MINIMUM .008"

(+) (−)

CARBON OR OTHER DOPANT

LAYERS OF pBN

SEMICONDUCTOR DETECTOR FOR THERMAL NEUTRONS BASED ON PYROLYTIC BORON NITRIDE

FIELD OF THE INVENTION

This invention relates to a neutron detector and more particularly to a solid state semiconductor neutron detector formed from pyrolytic boron nitride and to a method of manufacture of a pyrolytic boron nitride neutron detector.

BACKGROUND OF THE INVENTION

Neutrons are uncharged elemental particles which do not ionize matter as they pass through it. Accordingly, neutron particles are difficult to detect. Thermal neutrons are produced by splitting atoms such as Uranium 235 in a nuclear reactor and slowing the velocity of the fissioned neutrons through collisions with some moderating material. A Geiger counter is a conventional detector for detecting neutrons. The Geiger counter is a gas filled tube which may be filled with $^3$He or with $BF_3$ but has limited utility since it is both bulky and expensive to manufacture. Moreover, the Geiger counter requires repeated calibration. Other detection devices which are used to detect neutrons are based on the principle of scintillation which is an indirect process in which the interaction of neutrons with a detector scintillation material generates light which, in turn, permits light detectors to be used from which the level of neutron presence can be established. However, the light detectors need to be sensitive to the wavelength of the light. Otherwise, an emulsion film must be used. The use of scintillation detectors for detecting neutrons is inefficient because optics cannot gather all of the light and some of the light is reabsorbed by the scintillating material. Furthermore, light detectors have an inherent sensitivity limit to all wavelengths.

At present no solid state detector is commercially in existence capable of detecting thermal neutrons. The present invention utilizes pyrolytic boron nitride to form a solid state thermal neutron detector in which a direct electrical signal is formed proportional to the alpha particles generated from the interaction of the colliding neutrons with the boron-10 isotope in pyrolytic boron nitride. Pyrolytic boron nitride (hereinafter "pBN") is formed by chemical vapor deposition using a process described in U.S. Pat. No. 3,182,006, the disclosure of which is herein incorporated by reference, involving introducing vapors of ammonia and a gaseous boron halide such as boron trichloride ($BCL_3$) in a suitable ratio into a heated furnace reactor to deposit boron nitride on the surface of an appropriate substrate such as graphite. The boron nitride is deposited in layers and when separated from the substrate forms a free standing structure of pBN.

Pyrolytic boron nitride ("pBN") is anisotropic and has a hexagonal crystal lattice. In fact, most boron nitride made of CVD is composed of hexagonal crytallites in which the a- and b-axes are predominantly oriented parallel to the deposition surface. The hexagonal structure and preferred orientation impart highly anisotropic properties to the pBN. Because of symmetry, the a- and b-axes are equivalent, so it is convenient to describe pBN as having only two sets of properties, i.e., in the ab direction and in the c direction. In a single crystal of BN, the 'ab planes' are perpendicular to the layers. In pBN, the 'ab planes' have no preferred orientation except in the direction normal to the deposition layers. The crystographic planes, such as the c plane, are normal to their axes, so that the c plane in pBN is predominantly parallel to the deposition layers. Since the pBN deposits are for practical purposes limited to a few mm thick, the edge surface area is small in comparison with that attainable on the deposition surface. However, all previous attempts to capture neutrons using a pBN detector fabricated in a conventional fashion and oriented to collect neutrons through the deposition layers, i.e., the predominantly c-axis direction, have yielded poor results.

SUMMARY OF THE INVENTION

It has been discovered in accordance with the present invention that by forming a pBN detector with electrical contacts parallel to the c-axis direction, i.e. normal to the ab planes, the sensitivity to thermal neutrons is significantly increased. Moreover, in accordance with the present invention it is preferred that the pBN material is formed with a predetermined thickness of between one micron to one mm and that electrical contacts are applied the pBN material on either side of this thickness.

A solid state neutron detector of pBN may be formed in accordance with the present invention in which a direct electrical signal is generated from alpha particles produced in response to the interaction of neutrons with the pBN detector material by applying electrical contacts on two ends of the pBN detector material aligned parallel with the "ab planes" and by connecting the electrical contacts to an electrical analyzer.

The pBN neutron detector of the present invention comprises a multi-layered pBN material with a crystalline lattice structure having two opposed edge surfaces aligned to correspond with the "ab-planes" of the structure, metallized contacts contacting each of said opposed surfaces for conducting electrons to detect neutrons and with the structure having a thickness between the opposed edge surfaces of between one micron and one mm. The preferred thickness for pBN is 1.00 microns (0.004 inches). An array of metallized contacts may be formed in the pBN material as layered strips parallel to one another and separated by a distance of between 25 and 100 microns with a preferred separation of 50 microns. The array of metallized contacts should be placed on a pBN surface aligned in a direction parallel to either the a plane or b plane respectively.

The method of forming a neutron detector in accordance with the present invention comprises the steps of depositing multiple layers of pBN having a crystalline lattice structure with its crystallographic 'c plane' predominantly parallel to the deposited layers to form a given geometry with two opposite sides aligned parallel to the 'ab planes' of the structure and a thickness of between one micron and one mm, applying metallized contacts to said opposite sides, and orienting said detector relative to a source of neutrons such that the neutrons will pass through the volume of the detector and cause electrons in response to alpha particles generated from the presence of of neutrons to conduct through the structure parallel to the c plane.

BRIEF DESCRIPTION OF THE OF THE DRAWINGS

Other advantages of the present invention will become apparent from the following description of the invention when read in conjunction with the accompanying drawings of which:

Figure 2A:
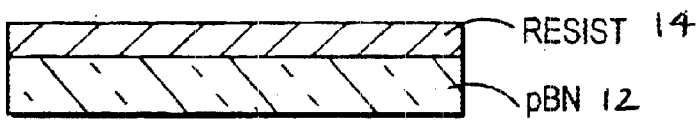
Figure 2B:
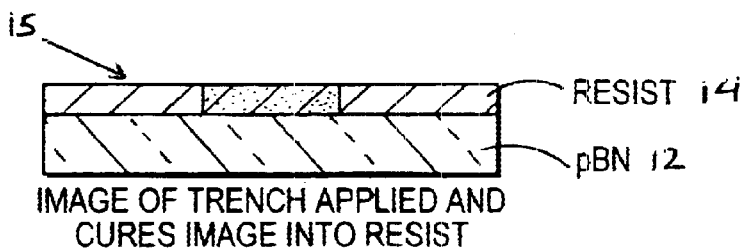
Figure 2C:
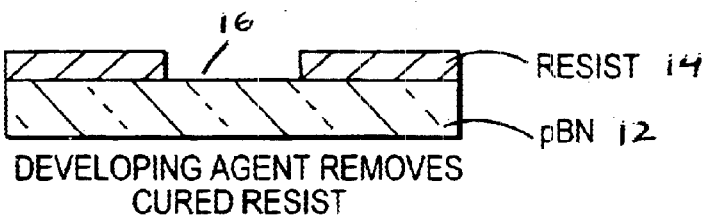
Figure 2D:
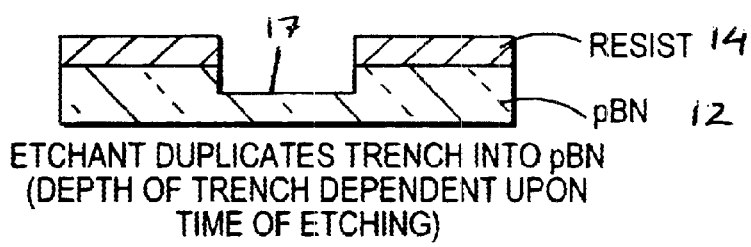
Figure 2E:
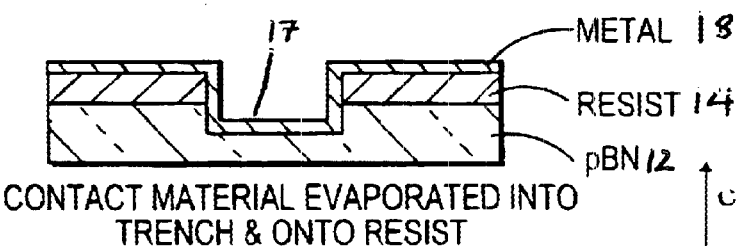
Figure 2F:
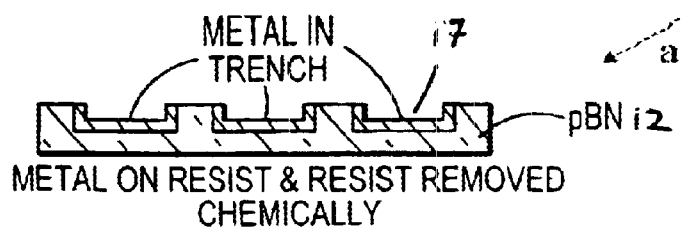
Figure 2F:
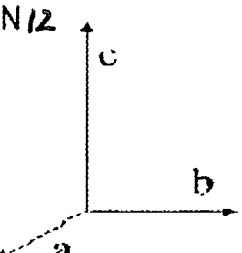
Figure 3:
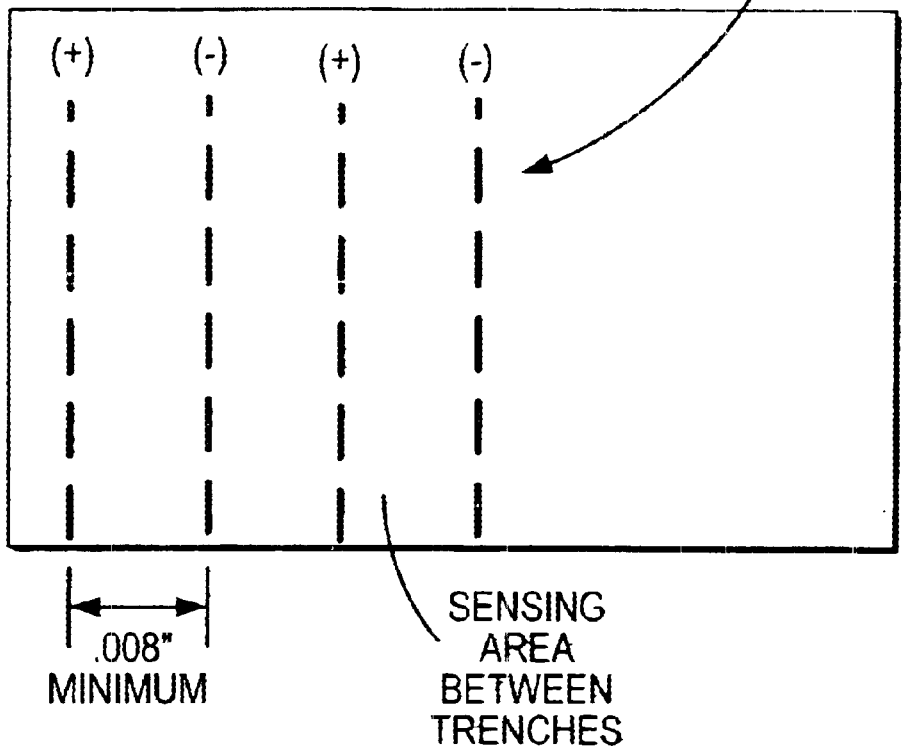
Figure 4:
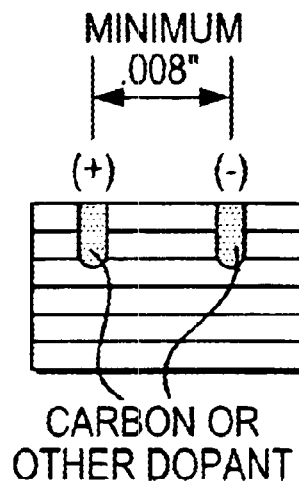

FIGS. 2(a)–2(f) show the stage progression using lithography to form an array of contacts on the pBN neutron detector of the present invention;

FIG. 3 is a top view of the finished array of contacts formed on the pBN neutron detector using the steps in FIGS. 2(a)–2(f);

FIG. 4 is a cross sectional side view of a pBN plate showing a pattern of contacts formed in the pBN neutron detector structure by ion implantation; and

DETAILED DESCRIPTION OF THE PREFERRED EMBODIMENTS

Figure 1A:
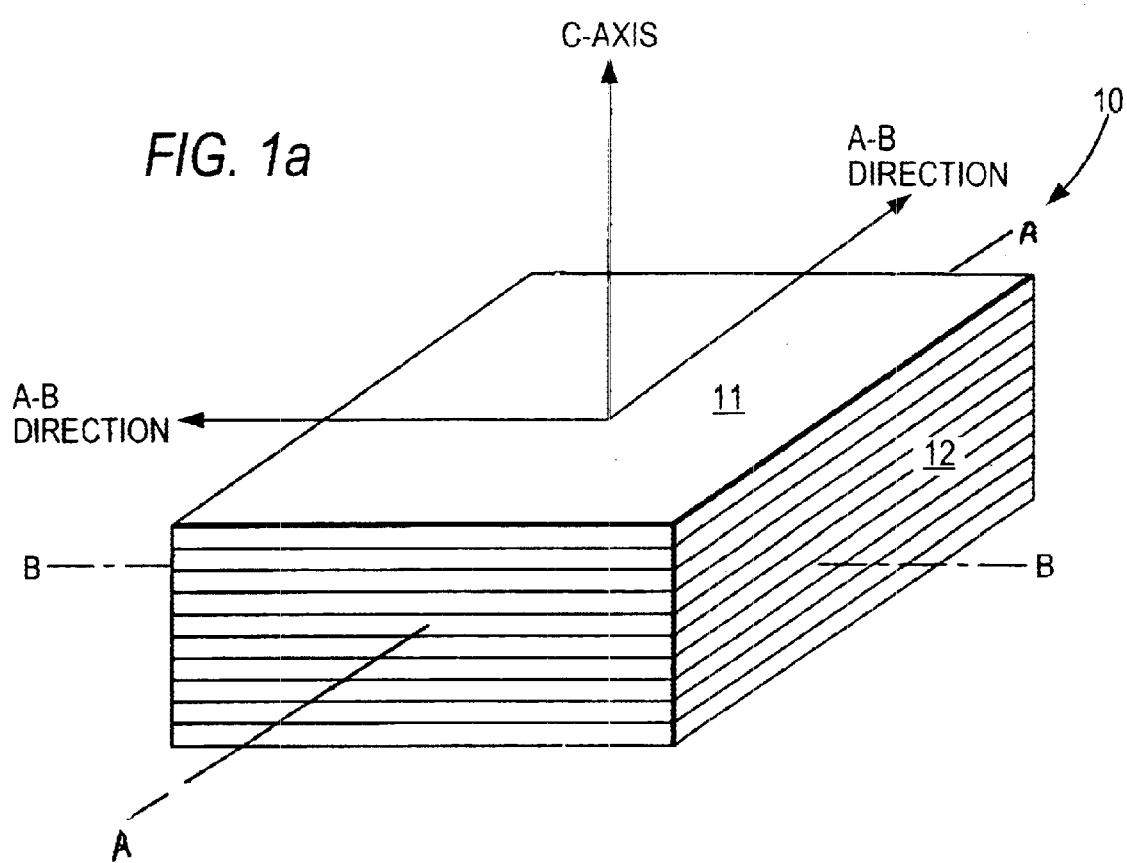
FIG. 1(a) is a view in perspective of a layered hexagonal pBN structure showing the a, b and c directions of the hexagonal lattice.
Figure 1B:
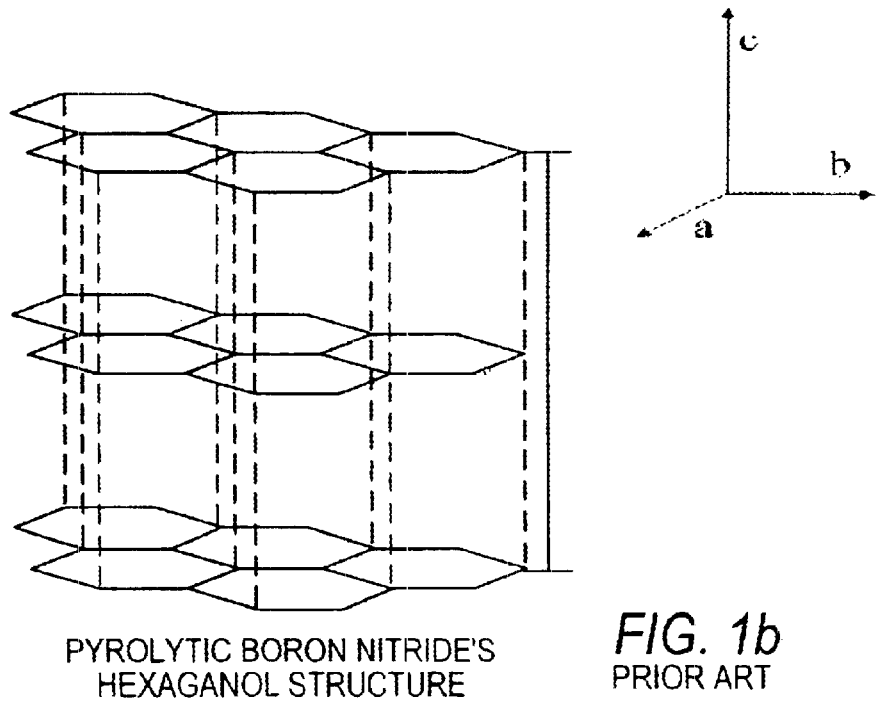
FIG. 1(b) is a perspective view of the lattice structure of hexagonal pBN.

A conventional pyrolytic boron nitride structure may be configured into any shape such as that of a rectangular plate 10 as shown in FIG. 1. The pyrolytic boron nitride material has a hexagonal crystalline lattice structure as shown in FIG. 1(a) which is grown in layers 11 in a direction corresponding to the c axis-direction shown in FIG. 1.

In the past electrical contacts were applied to the two large opposing surfaces 11 of the plate 10 which lie perpendicular to the plane designated A—A in FIG. 1 such that electrons generated by Boron-10 and neutron interactions will pass through layers 11. This arrangement however yielded poor results. In accordance with the present invention electrical contacts are applied to the opposite edge surfaces 12 of the structure 10 i.e., the a–b plane surfaces of the structure which lie parallel to the thickness of the plate 10 designated B—B in FIG. 1. The thickness of the plate 10 which corresponds to the distance separating the contacts should be no more than between one micron and one mm based upon the conclusion that this is the attenuation range for alpha particles generated when neutrons interact with the boron-10 isotope in pBN material. It should be understood that the alpha particles generate an electron-hole pair which are oppositely charged and travel to the applied contacts at the opposite edges 12 of the pBN plate. The conductivity of pBN is higher in the B—B direction than any other direction.

A pBN neutron detector is preferably fabricated in accordance with the present invention by cutting a thin strip or slice 12 from a conventional plate 10 of hexagonal pBN material along the ab direction as is shown in FIG. 1. The thickness of the strip 10 should be between one micron and one mm thick and preferably about 1.00 microns (0.004 inches) thick. A large array of detectors can be formed on a single strip 12 of pBN material using conventional lithography techniques as is illustrated in FIGS. 2(a)–2(f). Normally a photosensitive resist layer 14 is applied to a surface of the pBN strip 12 aligned with the ab plane as shown in FIG. 2(a). Then a pattern is machined in a conventional mask (not shown) and a light source placed behind the mask to create an image on the strip surface where the light gets through the mask for forming a cured image in the resist layer 14 as shown in FIG. 2(b). A multiple number of cured images may be formed in one resist layer forming a pattern having any desired number of parallel cured images in the resist layer on the pBN material. FIG. 2(b) shows one cured image 15 in the resist layer 14. A conventional chemical agent known as a developing agent is applied to the resist layer to remove the cured resist from the resist layer 14 to form a channel 16 as shown in FIG. 2(c). A conventional etchant is then applied in the channel 16 to form a trench 17 in the pBN strip 12 directly below the channel 16 as is shown in FIG. 2(d). The width of the trench 17 corresponds to the width of the channel 16 in the resist layer 14 whereas the depth of the trench 17 is a variable determined by the duration of the application of etchant. A metal material is then evaporated over the resist layer 14 and over the trench 17 to form a coated layer of metal 18. The metal coating 18 and the resist material 14 underneath the coating 18 is chemically removed except in the area of the trench 17 so that the trench 17 and the coating of metal 18 above the trench 17 remains as is shown in FIG. 2(e). This leaves the pBN strip 12 with one or more trenches 17 in which each trench 17 is covered with a metal coating 18 as is shown in FIG. 2(f) to form an array of metallized contact points. A top view of the array is shown in FIG. 3. The array of metallized contact points are electrically connected to electrical conductors which, in turn, may be connected to a conventional muti-channel analyzer as shown in FIG. 4 to measure the electron flow corresponding to the number of alpha particles formed when neutrons interact with the pBN material on the array surface. The trenches 17 should be separated from one another by a distance of between about 25 and 100 microns with a preferred separation of 50 microns. The alpha particle generated in a boron-10 isotope interaction with a neutron loses about 0.2% of its energy to the electrons with which it interacts and generally loses all energy (100%) through attenuation in the pBN material within an interaction distance of about 2 microns (0.008 inches) or greater and up to about 50% of its energy within an interaction distance of up to about 1 micron (0.004 inches). The thickness of the pBN material for good resolution should optimally be between about one micron and one mm.

An array of metallized contact points may also be formed in the pBN material by ion implantation in which a dopant material is implanted into the pBN material to form a contact pattern equivalent to the pattern formed by lithography as explained above in connection with FIGS. 2(a)–2(f). The dopant is concentrated in channels 20 aligned parallel to one another on one side in the ab plane of the pBN material strip 12 as is shown in FIG. 4 with the concentration of dopant controlling the resistivity of each channel 20. The resistivity of the channels 20 are in proportion to the concentration of dopant for a given dopant material. Any low resistivity dopant may be used preferably carbon or carbon and oxygen. The doped BN can be monolitic or layered. Doped layers may be spaced apart a distance of between 5–500 microns and the thickness of dopant may be controlled from 10–10,000 angstroms. The doped BN controls the electrical properties along the a–b directions.

What is claimed is:

1. A pBN neutron detector of multiple pBN layers having a crystalline lattice structure comprising a geometry having two opposed edge surfaces aligned to correspond with ab planes of the crystalline lattice structure, with the structure having a thickness of between one micron and one mm between the opposed edge surfaces and further comprising at least one metallized contact on each of said opposed surfaces to detect the presence of neutrons interacting with the volume of the detector.

2. A pBN neutron detector as defined in claim 1 wherein each opposed surface has at least one metallized contact separated from each other a distance of between 20 and 100 microns.

3. A pBN neutron detector as defined in claim 1 wherein the thickness between the opposed edge surfaces is about 100 microns.

4. A pBN neutron detector as defined in claim 2 wherein said contacts are separated by at least 50 microns.

5. A pBN neutron detector as defined in claim 3 wherein said at least one contact are in the form of metallized strips in parallel with one another.

6. A method of forming a pBN neutron detector to detect the presence of neutrons comprising the steps of depositing multiple layers of pBN having a crystalline lattice structure with its crystallographic c plane predominantly parallel to the deposited layers to form a given geometry with two opposite sides aligned parallel to ab planes of the structure having a thickness of between one micron and one mm, applying metallized contacts to said opposite sides, and orienting said detector relative to a source of neutrons such that the neutrons will interact with the volume of said detector and cause electrons in response to alpha particles generated from the presence of of neutrons to conduct through the structure parallel to the c plane.

7. A method as defined in claim 6 further comprising forming an array of metallized contacts on each of said two opposite sides in the form of strips separated from each other a distance of between 20 and 100 microns.

8. A method as defined in claim 7 wherein said strips are formed by lithography comprising the steps of forming a photosensitive resist layer on a surface of the pBN material aligned with the ab plane; passing light through a mask onto the photosensitive resist layer with the mask having a desired pattern to create a cured image of the pattern on the photosensitive resist layer where the light gets through the mask; removing the cured resist from the resist layer to form one or more channels in the resist material; applying an etchant in the channels to form corrresponding trenches in the pBN material below the channels; evaporating metal material over the resist material and over the trenches and chemically removing the evaporated metal material and resist material except in the area of the trenches to form an array of metallized contact strips aligned parallel to each other.

9. A method as defined in claim 7 wherein said strips are formed by ion implantation in which a dopant is implanted in the surface of the pBN material aligned with the ab plane in a pattern forming metal contact strips having a controlled resistivity at the implanted surface of the pBN material.

10. A method of forming a pBN neutron detector as defined in claim 8 wherein said dopant is carbon.

11. A method of forming a pBN neutron detector as defined in claim 8 wherein said dopant is carbon and oxygen.

12. A method as defined in claim 11 wherein the doped layers are spaced a distance of between 5–500 microns.

13. A method as defined in claim 12 wherein the thickness of dopant lies between 10–10,000 angstroms.

* * * * *